United States Patent
Chesser et al.

(10) Patent No.: US 7,097,217 B2
(45) Date of Patent: Aug. 29, 2006

(54) INTEGRATED SECURITY MECHANISM

(75) Inventors: Joshua J. Chesser, Downers Grove, IL (US); Andrew C. Crouse, Woodridge, IL (US); Alex V. Degutis, East Chicago, IN (US); Peter J. Gubricky, Oswego, IL (US); Charles L. Horne, Chicago, IL (US); David A. Oestermeyer, Downers Grove, IL (US); James M. McLaughlin, Monee, IL (US)

(73) Assignee: Salco Products, Inc., Lemont, IL (US)

( * ) Notice: Subject to any disclaimer, the term of this patent is extended or adjusted under 35 U.S.C. 154(b) by 0 days.

(21) Appl. No.: 10/735,215

(22) Filed: Dec. 11, 2003

(65) Prior Publication Data

US 2005/0127690 A1 Jun. 16, 2005

(51) Int. Cl.
*E05B 39/02* (2006.01)
(52) U.S. Cl. .................................. 292/284; 292/307 R
(58) Field of Classification Search ............ 292/307 R, 292/315, 318, 319, 323, 325, 327, 284, 286, 292/282; 70/56
See application file for complete search history.

(56) References Cited

U.S. PATENT DOCUMENTS

| 3,736,016 A | * | 5/1973 | Garvey et al. | ............... 292/281 |
| 4,064,714 A | * | 12/1977 | Treslo | ............................ 70/18 |
| 4,458,510 A | * | 7/1984 | Nielsen | ........................ 70/212 |
| 5,092,143 A | * | 3/1992 | Rumbles | ........................ 70/56 |

FOREIGN PATENT DOCUMENTS

WO    WO 01/54100    * 7/2001

* cited by examiner

*Primary Examiner*—Gary Estremsky
(74) *Attorney, Agent, or Firm*—Leydig, Voit & Mayer, Ltd.

(57) ABSTRACT

The present disclosure shows a security lock arrangement for a covered access opening. It shows a cable seal lock body housed in the cavity of a housing that is welded to a structure defining a covered access. The cable of the cable seal lock passes through a latch for the access opening cover and through the lock body from which it cannot be removed without destruction of the cable. A new cable is usable with the lock body permanently mounted to the covered access opening structure.

14 Claims, 4 Drawing Sheets

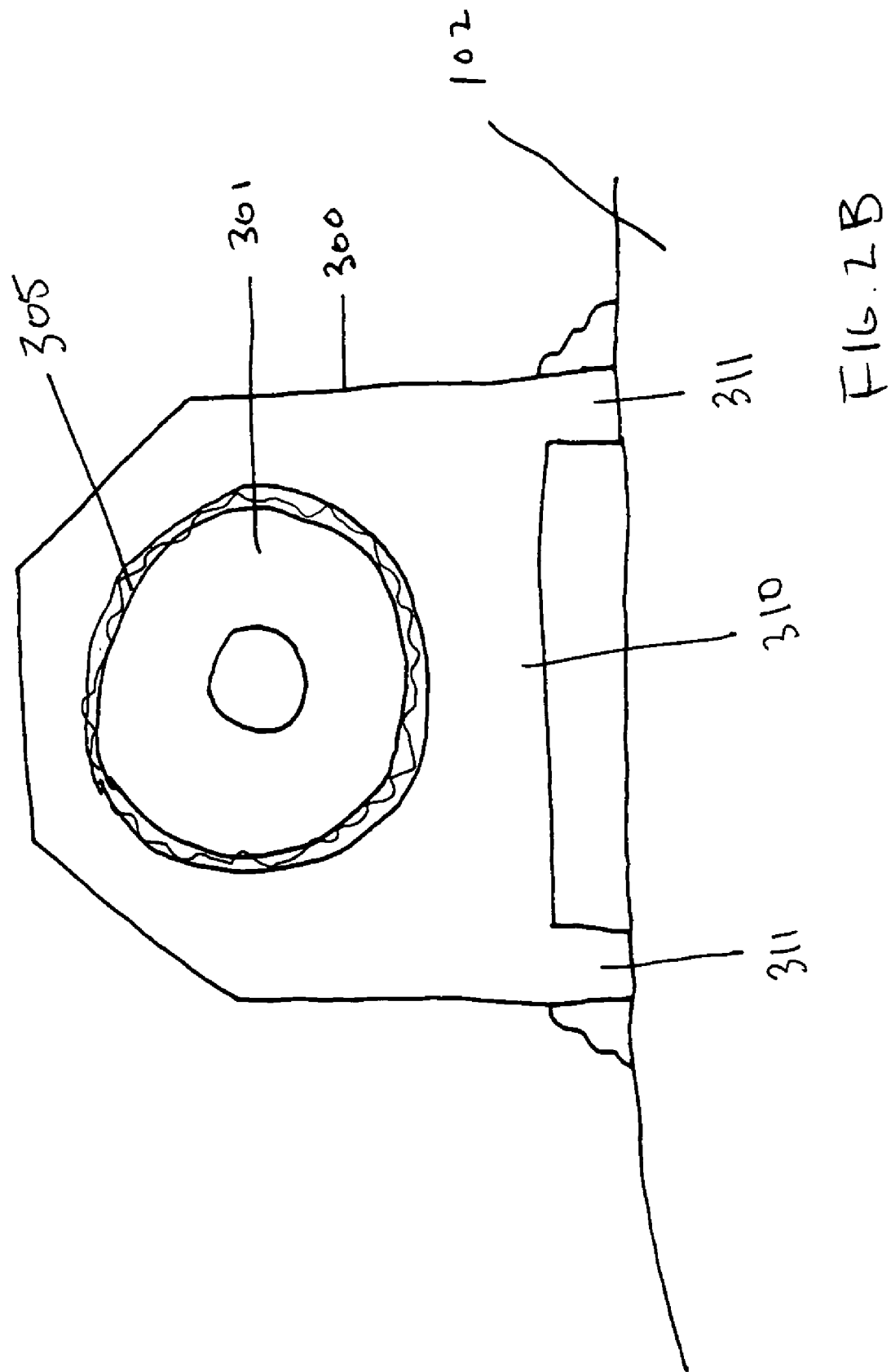

INTEGRATED SECURITY MECHANISM

BACKGROUND OF THE INVENTION

This invention relates to cable seal locks. More particularly, it relates to cable seal locks having a body suitable for reuse.

Bulk and other storage and transportation compartments frequently require security mechanisms to preserve the integrity of the contents of the compartments. Often it is desirable to be aware of instances of unauthorized opening of or entry into such compartments. This is particularly true in those situations where theft or contamination of the contents of the compartments is otherwise difficult to ascertain. Such situations exist, for example, where the contents of the compartment is in bulk or infrequently inventoried, or where even small amounts of certain contaminants are unacceptable. Comprehensive testing for contaminants is usually impractical or prohibitively expensive.

Certain security devices, such as the ordinary padlock, usually do not provide an indicia of tampering. A successful thief or saboteur that defeats such a device can easily reaffix it or install a similar or duplicate device if the original was destroyed without leaving behind any indication of access.

Cable seal locks are security devices that can provide the sort of indication of unauthorized access that is often desirable. Cable seal locks are single use mechanisms. Each lock includes a body and a cable. Examples of such locks are found in U.S. Pat. Nos. 5,222,776; 5,353,003 and 5,582,447. Often, one end of the cable is attached to the body.

Typically, the free end of the cable is inserted into a passage of the lock body mechanism that allows entry of the cable into the body in one direction but does not allow removal of the cable in the other direction without extreme force. In the case where one end of the cable is attached to the body of the lock, inserting the cable into the passage results in a loop of cable, which can be formed through a hasp or similar device near the access closure of the compartment to be secured, such that to gain access to the compartment through the access closure, the cable must be cut.

Another form of cable lock involves a cable that is not attached to the body but that includes an abutment or head opposite the free end of the cable that prevents the cable from passing through the lock body. In this situation the cable acts as a latch pin or deadbolt that can be threaded through the hasp or similar device on the closure member and through the lock body passage. The cables of this type of cable seal lock also must be destroyed by cutting to gain access to the compartment.

The lock body of a cable seal lock can be labeled, painted or serially numbered for additional security.

When creating a seal with the cable seal lock, the cable is advantageously passed through the lock body passage so that a maximum amount of cable is passed through the passage and therefore, once the cable is cut to remove the seal from the protected closure a minimum amount of cable remains attached to the lock body or head. This prevents the seal from being remade with the same cable, which would defeat the purpose of the cable seal lock, and also ensures a tight closure involving minimal slack of the cable and therefore minimal freedom of movement of the components of the closure mechanism. Because the seal cannot be remade with the same cable, broken cable or missing or mis-numbered security devices provide evidence of opening of the access closure and possible entry into the compartment.

Where authorized entry is required, the cable must be cut. Once cut, the cable seal lock and the severed cable, which now can be removed from the lock, are discarded. Thus, while security protocols involving cable seal locks advantageously provide indicia of possible unauthorized access or entry into storage or transportation compartments, they disadvantageously involve significant cost owing to the disposable nature of the cable seal lock security devices.

SUMMARY OF THE INVENTION

The present invention is directed to a security protocol involving cable seal locks that avoids the expense of providing a new lock body after each instance of access through a covered access opening. The defining feature of a cable seal lock arrangement according to the present invention is that the cable seal lock body is secured in a housing that is permanently welded to the structure that defines the access opening.

One application of the present invention involving railroad car security is described in detail below. The embodiment of the present invention described below is illustrative only and is not limiting.

BRIEF DESCRIPTION OF THE DRAWINGS

FIG. 2B is a front view of the cable seal lock housing welded to a structure defining an entry hatch to the railroad car.

DETAILED DESCRIPTION OF THE ILLUSTRATED EMBODIMENT

Railroad cars, such as cars carrying chemicals or the like, often involve covered access openings or hatches on the top of the car that are opened when necessary to filling or emptying the compartment defined by the car body. Such hatches are equipped with covers secured with security mechanisms to discourage occurrences of vandalism, contamination or theft. The security mechanism used on the hatches of railroad cars is typically a cable seal lock of the types previously discussed.

Figure 1A:
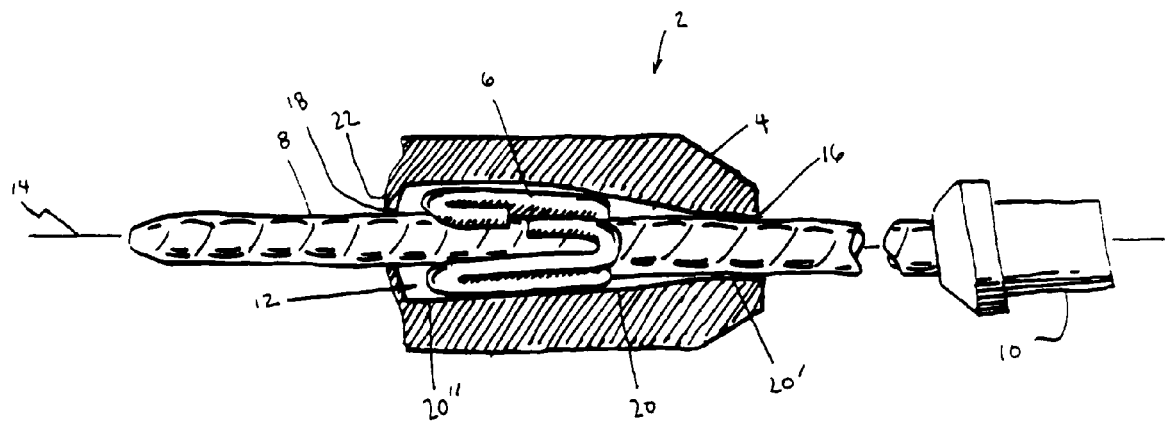
FIGS. 1A and 1B are partial sectional views of cable lock mechanisms known in the art.
Figure 1B:
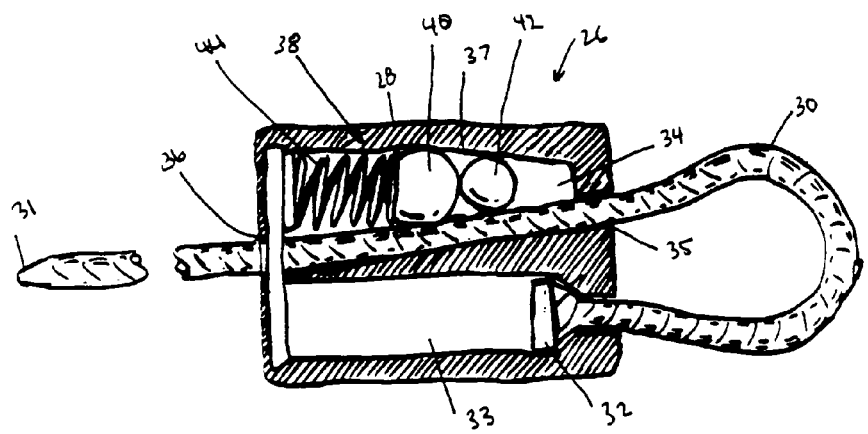

Cable seal locks work in this situation by providing a cable that prevents the opening of the hatch's cover by looping around, or passing through, a hasp mechanism that must be opened to allow the hatch cover itself to be opened. FIGS. 1A and 1B show types of cable lock mechanisms known in the art of cable seal locks that are often useful in this application. Both of the locks depicted, and most cable seal locks generally, involve applying orthogonal pressure on the cable when the cable is passed in one direction through a passage in the lock body and involve relatively little orthogonal pressure applied to the cable when the cable is passed through the passage in the lock body in the opposite direction. Cable seal apparatus such as illustrated in FIGS. 1A and 1B are well known and are further illustrated and disclosed in U.S. Pat. Nos. 5,222,776; 5,352,003 and 5,582,447, the disclosures of which hereby incorporated by reference.

FIG. 1A depicts a cable seal lock assembly described in more detail in U.S. Pat. No. 5,582,447.

In FIG. 1, cable seal lock 2 comprises a body 4, a serpentine shaped spring clip 6, a stranded metal cable 8, and a swaged end or abutment 10. The lock 2 is used as a security lock in this embodiment to secure a door or hatch.

The body 4 in FIG. 1A is preferably made of hardened metal, but could be molded thermoplastic or other metals in the alternative according to a given implementation. The body 4, sometimes referred to as a casing, includes passage 12 concentric with longitudal axis 14. The body 4 defines cable openings 16 and 18 at opposite ends. Between the openings is tapered bore surface 20 that defines passage 12.

The tapered bore surface 20 preferably comprises two sections, a tapered surface portion 20' and a second enlarged tapered surface portion 20". The surface portion 20' merges tangentially with surface portion 20" to form a smooth continuous annular bore surface 20 in the body 4.

The body 4 includes an annular lip 22 which is rolled over to form a closure flange. Serpentine spring or clip 6 is disposed in the passage 12 at the larger diameter bore surface portion 20" of the body 4. The cylindrical bore surface portion 20" has an axial extent larger than the length of clip 6 so the clip 6 can longitudinally displace therein. The body 4 at opening 16 defines an axial extent of bore surface 20' to serve as a guide for insertion of the face end 9 of cable 8 into the passage 12.

The free end 9 of cable 8 is first passed through a hasp or other device to be secured. As the cable 8 is moved farther into the lock body passage 12, the clip 6 is allowed to move into the wider portion of tapered bore surface portion 20" of the lock body passage 12. There, the serpentine spring 6 relaxes and expands away from the cable, releasing the cable 8 and allowing it to move freely through the lock body passage 12 in one direction. Abutment 10, attached to cable 8, prevents cable 8 from entirely passing through the hasp or other secured device or passage 12 of cable seal lock body 4. Orthogonal pressure applied to the cable 8 is created by the serpentine spring or cable 6 which is, in essence, a cylindrical cuff which compresses onto the cable 8 as it is encouraged by friction from the surface of the cable 8 into the narrower portion of tapered bore surface 20 of the lock body passage 12. Once the cable 8 is inserted in the body 4, it cannot be pulled out and must be cut between the housing and head 10 to be removed.

FIG. 1B depicts a cable seal lock assembly described in more detail in U.S. Pat. No. 5,222,776.

The cable seal lock 26 includes a housing or body 28 and a cable 30. Cable 30 is a standard steel cable having a free end 31 and includes a swaged or similarly formed head 32 at its other end. Housing body 28 defines two chambers or passages 33 and 34. Passage 33 is closed at one end and has an opening at the other through which the cable 30 passes. The head 32 is permanently received within passage 33.

Passage 34 extends through housing 28 and includes openings 35 and 36 that pass the cable 30. The opening 35 is at the same end of housing 28 as the opening through which the cable extends from passage 33. The cable is of a length to be looped around and the free end passed into passage 34 through opening 35 and out of through passage 34.

The inner wall defining through passage 34 is tapered toward opening 35. The passage 34 is defined by a conical locking surface 37 that diverges toward opening 36.

Passage 34 is substantially larger adjacent opening 36 and contains one way locking mechanism 38. Locking mechanism 38 includes a pair of locking balls of 40 and 42 that coact with the cable 30 spring 44 urges the balls toward the small end of conical wall 37 at opening 35.

In use, the free end 31 of cable 30 is passed through a member to be locked against entry and then inserted into opening 35. As it is passed into through passage 34 the free end displaces the balls 40 and 42 of one-way lock mechanism 38 along tapered wall 37 in passage 34 away from the small end of conical wall portion 37.

The orthogonal pressure applied to the cable 30 is created by balls 40 and 42 acting along the conical, tapered surface 37 of the lock body passage 34 in body 28. Balls 40 and 42 are urged toward the narrow end of the through passage 34 by spring 44. Cable end 31 entering passage 34 through opening 35 applies a force to balls 40 and 42 and moves them toward the opening 36 of the passage 34 so as to compress spring 44. With balls 44 at the wider end of the passage 34, little or no orthogonal pressure is applied against the cable 30, which is therefore able to pass through freely. When it is attempted to pull the cable 30 from the opening 36 of the passage 34, balls 40 and 42 move in the direction of the cable 30 and into the small end of tapered lock surface 37 of passage 34. The balls 40 and 42 apply orthogonal pressure on the cable 30 to prevent its movement in that direction. The spring 44 as well as friction of the cable 30 on balls 40 and 42 encourages the movement of balls toward the lock surface 37. As in the cable lock of FIG. 1A, the cable must be cut between head 32 and opening 35 of through passage 34 to remove the lock.

Other types of cable seal locks, not depicted in the drawings, but compatible with the present invention, also typically involve orthogonal pressure applied to a cable when effort is applied to remove it from the lock body in a direction opposite the direction of insertion. U.S. Pat. Nos. 4,681,355, 4,747,631, 5,352,003 and 5,611,583, are directed to such other cable seal locks. Each of these locks have in common that a cable is allowed to move through the lock body passage in only one direction. When the cable is to be removed, it must be cut between the head end and the entry into the housing.

Figure 2A:
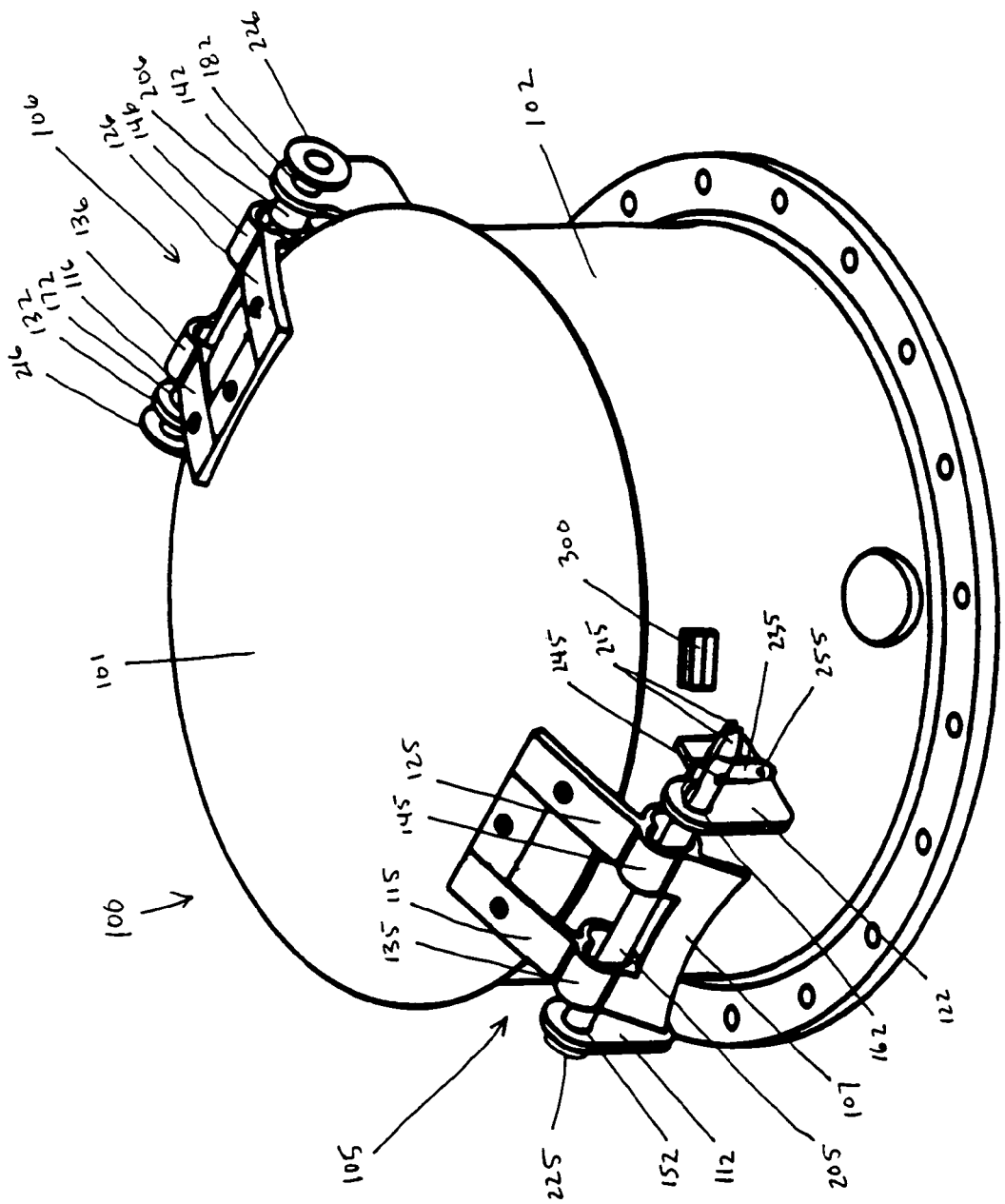
FIG. 2A is a perspective view of a railroad car covered entry hatch and a cable seal lock integrated with a covered access opening according to the present invention.
Figure 2C:
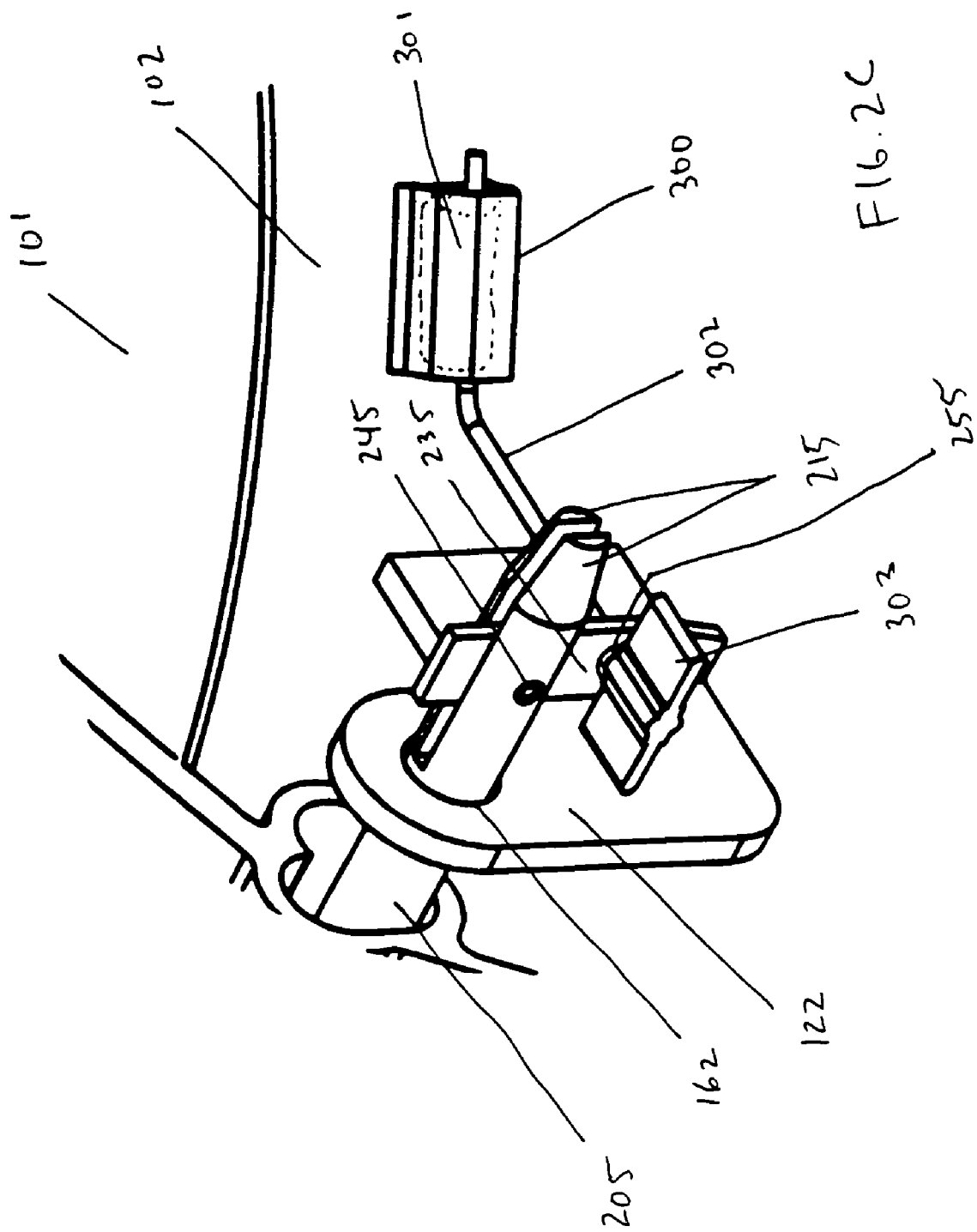
FIG. 2C is a perspective view of the cable seal lock arrangement of the present invention integrated with hatch entry to the railroad car.

FIGS. 2A through 2C depict a cable seal lock in accordance with the present invention secured in a housing that is permanently welded to a component of a railroad hatch near the handle of the access cover. In FIG. 2A, a loading nozzle 102 is covered by hatch cover 101. Hatch cover 101 includes hinge 106 and hasp or handle 105, disposed at opposite ends of hatch 100.

Hinge 106 includes two arms 116 and 126, each arm having a bale or cuff 136 and 146, respectively, at its end. Brackets 132 and 142 are attached to loading nozzle 102, at an end of hatch 100, such that hinge 106 is positioned between brackets 132 and 142. Brackets 132 and 142 include holes 172 and 182, respectively.

Hinge pin 206 is positioned through holes 172 and 182 of brackets 132 and 142 and is also positioned through cuffs or bales 136 and 146 of the arms 116 and 126 of hinge 106, such that hatch cover 101 can pivot about the longitudinal axis of hinge pin 206. Hinge pin 206 includes swaged ends 216 and 226 which prevent it from being removed from holes 172 and 182 of brackets 132 and 142 and cuffs 136 and 146 of hinge 106.

Handle 105 includes two arms 115 and 125, each arm having a cuff or bale 135 and 145, respectively, at its end. Handle 105 also includes grip 107. Brackets 112 and 122 are attached to loading nozzle 102, at the end of hatch 100 opposite the end having hinge 106, such that handle 105 is positioned between brackets 112 and 122. Brackets 112 and 122 define holes 152 and 162, respectively.

Clevis pin 205 is positioned through holes 152 and 162 of brackets 112 and 122 and is also positioned through cuffs or bales 135 and 145 of arms 115 and 125 of handle 105, such that when clevis pin 205 is so positioned, hatch cover 101 cannot be opened. End 225 of clevis pin 205 defines a clevis with spaced legs 215.

Clevis pin 205, best seen in FIG. 2C, also includes pivoted cross arm 235 and cross arm pivot pin 245 that connects cross arm 235 to clevis pin 205 between the two legs 215 of clevis pin 205. Cross arm 235 prevents clevis pin 205 from being unintentionally removed from holes 162 and 152 of brackets 122 and 112 and from bales or cuffs 145 and 135 of arms 125 and 115 of handle 105 unless cross arm 235 is pivoted about cross arm pivot pin 245 such that the longitudinal axes of clevis pin 205 and of cross arm 235 are co-linear, thereby allowing the clevis pin and cross arm assembly to be removed. Cross arm 235 also defines cable hole 255 positioned at the end of cross arm 235 opposite the end through which cross arm pivot pin 245 is positioned through cross arm 235.

Best seen in FIG. 2C, the cable seal lock of the present invention includes a housing 300, a lock body 301 and a cable 302 with enlarged head or abutment 303. As seen in FIG. 2B, the housing includes a base 310 with legs 311 permanently affixed to the loading nozzle 102 by welding or adhesive. The body could, however, have been secured to cover 101 without departing from the invention.

Housing 300 includes a bore into which lock body 301 is positioned. The lock body may be affixed in the bore by a suitable means such as by press or interference fit or by welding or adhesive as shown at 305 in FIG. 2B.

The lock body 301 is similar to the body 4 of the cable seal lock of FIG. 1A. Internally, it includes the structure and spring component there described. It defines the passages to permit passage of cable 302 through the body in one direction. As previously described any attempt to pull the cable in the opposite direction is precluded by the orthogonal force applied by the serpentine spring.

The cable 302 is sized to pass through the lock body and coact with the serpentine spring to permit passage in one direction but preclude removal in the other direction. Enlarged head 303 is sized to prevent passage through the lock body. It is also sized to prevent passage through cable hole 255 in cross arm 235.

FIG. 2C shows the structure of FIG. 2A sealed by cable seal lock of the present invention. In FIG. 2C, security seal is formed by passing cable 302 through cross arm hole 255 and through cable seal lock body 301. Once cable 302 has been inserted it cannot be removed by being pulled in a direction opposite the direction it entered cable seal lock 301 without extreme force. As such, to remove cable 302, it must be cut between cable seal lock 301 and head 303 of cable 302. Cable 302 is advantageously inserted into cable seal lock 301 to a maximum extent such that abutment 303 contacts cross arm 235 and there is no loose cable between the two. When cable 302 is positioned as described and depicted in FIG. 2C, the clevis pin and cross arm assembly cannot be removed from hole 162 of bracket 122. As such, when so positioned cable 302 serves to seal hatch cover 101 and must be cut and removed from cross arm hole 255 for hatch cover 101 to be opened.

Many alternatives are contemplated. For example, the cable lock could be of the configuration of that illustrated in FIG. 1B and the cable free end 31 passed through the cable hole 255 in cross arm 235 before it is returned to the locking passage in the lock body. In this embodiment, the passage 33 of the lock body 28 must be open at the end also having opening 36 and opposite the end having opening 35 to allow for removal of the portion of severed cable that remains in passage 33 once the cable is cut and to allow for the insertion of a new cable into passage 33 after each use.

The present invention may be embodied in other specific forms without departing from its spirit or essential character. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed:

1. A security mechanism for a covered access opening including a member defining said opening and a relatively movable member defining a cover therefor comprising:
    a cable lock assembly comprising:
    a cable lock body defining a passage sized to receive a cable;
    a cable including a first end sized to fit through said cable lock body passage and including a second end having an abutment;
    a mechanism in said cable lock body engageable with said cable to permit movement of said cable through said passage in the direction in which it entered said passage and preventing movement of said cable in the opposite direction;
    a housing defining an opening to receive the cable lock body;
    said cable lock body affixed to said housing within said opening; and
    said housing directly affixed to one of said members.

2. A security mechanism as claimed in claim 1 wherein said cable lock body is permanently affixed within said opening of said housing by a weld connected between said opening and said cable lock body.

3. A security mechanism as claimed in claim 1 wherein said cable lock body is affixed within said opening of said housing by an adhesive connected between said opening and said cable lock body.

4. A security mechanism as claimed in claim 1 wherein said mechanism in said cable lock body comprises a spring and a ball, said spring and ball being arranged to releasably urge said ball against said cable to prevent movement of said cable in said opposite direction.

5. A security mechanism for a covered access opening comprising:
    a cable lock assembly comprising:
    a cable lock body defining a passage sized to receive a cable;
    said cable including a first end sized to fit through said cable lock body passage and including a second end precluded from passing therethrough;
    a mechanism in said cable lock body engageable with said cable to permit movement of said cable through said passage in the direction in which it entered said passage and preventing movement of said cable in the opposite direction;
    a housing;
    said cable lock body being secured to said housing;
    said housing including a base adapted to be permanently affixed to a structure to be secured; and
    wherein said housing further includes at least one leg that extends from said base and wherein said base is adapted to be permanently affixed to a structure to be secured through said at least one leg of said housing.

6. A security mechanism for a covered access opening comprising:
a covered access structure comprising:
a first member defining an access opening;
a second member adapted to cover said access opening defined by said first member;
a hasp having at least one component positioned on said first and at least one other component positioned on said second member;
a cable lock assembly comprising;
a cable lock body defining a passage sized to receive a cable;
said cable including a first end sized to fit through said cable lock body passage and including a second end precluded from passing therethrough;
a mechanism in said cable lock body engageable with said cable to permit movement of said cable through said passage in the direction in which it entered said passage and preventing movement of said cable in the opposite direction;
a housing separate from said first member and second member defining an opening to receive the cable lock body;
said cable lock body affixed to said housing within said opening; and
wherein said housing is permanently affixed to one of said first and second members.

7. A security mechanism as claimed in claim 6 wherein said cable lock body is permanently affixed in said opening in said housing by an adhesive.

8. A security mechanism as claimed in claim 6 wherein said housing further includes a base adapted to be permanently affixed to one or the other of said first and second members, and at least one leg that extends from said base and wherein said base is permanently affixed to said one of said first and second members through said at least one leg of said housing.

9. A security mechanism as claimed in claim 6 wherein said mechanism in said cable lock includes a spring and a ball, said spring and ball being arranged to releasably urge said ball against said cable to prevent movement of said cable in said opposite direction.

10. A security mechanism as claimed in claim 7 wherein said housing is secured to one of said first and second members by an adhesive.

11. A security mechanism for a covered access opening as claimed in claim 6 wherein said cable lock body is affixed within said opening in said housing by an interference fit between said opening and said cable lock body.

12. A security mechanism for a covered access opening comprising:
a covered access structure comprising:
a first member defining an access opening;
a second member adapted to cover said access opening defined by said first member;
a hasp having at least one component positioned on said first and at least one other component positioned on said second member;
a cable lock assembly comprising;
a cable lock body defining a passage sized to receive a cable;
said cable including a first end sized to fit through said cable lock body passage and including a second end configured to preclude passing through said passage;
a mechanism in said cable lock body engageable with said cable to permit movement of the cable through said passage in the direction in which it entered said passage and preventing movement of said cable in the opposite direction;
a housing;
said cable lock body being secured to said housing; and
wherein said housing is permanently affixed to one of said first and second members.

13. A security mechanism as claimed in claim 12 wherein said cable lock body is permanently affixed to said housing by welding and said housing is secured to one of said first and second members by welding.

14. A method of securing and releasing a covered access opening multiple times in sequence, wherein the access opening includes a member defining an opening, and a relatively movable member defining a cover, a hasp including a first hasp component on the member defining the opening and a second hasp member on the member defining the cover, the steps comprising:
providing a cable lock assembly mounted on one of the members defining the opening and the cover;
said cable lock assembly including a cable lock body defining a through passage having a first open end and a second open end and a cable sized to pass through said passage having a free end arranged to be inserted in said first end of said passage and pass through said passage and out said second end, said cable having a second end precluded from entering said first end of said body;
a mechanism in said cable lock body engagable with said cable to permit movement of said cable through said passage in the direction which it entered and preventing movement in the opposite direction;
a housing defining an opening to receive the cable lock body, said cable lock body affixed to said housing in said opening and said housing directly affixed to one of said members;
the steps further comprising;
passing said free end of said cable through said hasp components and said passage of said cable lock body to secure said cover member against movement relative to said access opening defining member;
thereafter, cutting said cable to separate said first and second ends thereof and removing said cable from said hasp components and said cable lock body to release said cover member for movement relative to said access opening defining member;
and thereafter providing an additional cable and associating said additional cable with said cable lock assembly and said hasp components in the same relation as said first cable to secure said cover member against movement relative to said access opening defining member, and thereafter repeating said steps of cutting and removing said cable and associating a new cable with said cable lock assembly and said hasp components to sequentially secure and release said members using a new cable each time said members are secured and using the same cable lock assembly.

* * * * *